(12) United States Patent
Linden

(10) Patent No.: US 7,273,064 B2
(45) Date of Patent: Sep. 25, 2007

(54) TEMPERATURE-SENSITIVE SAFETY VALVE ASSEMBLY

(75) Inventor: Sean Linden, Birmingham (GB)

(73) Assignee: The Linden Shield Limited, Birmingham (GB)

( * ) Notice: Subject to any disclaimer, the term of this patent is extended or adjusted under 35 U.S.C. 154(b) by 0 days.

(21) Appl. No.: 10/496,342

(22) PCT Filed: Nov. 1, 2002

(86) PCT No.: PCT/GB02/04981

§ 371 (c)(1),
(2), (4) Date: Nov. 19, 2004

(87) PCT Pub. No.: WO03/046421

PCT Pub. Date: Jun. 5, 2003

(65) Prior Publication Data

US 2005/0067011 A1    Mar. 31, 2005

(30) Foreign Application Priority Data

Nov. 22, 2001 (GB) .................. 0127969.4
Jun. 20, 2002 (GB) .................. 0214736.1

(51) Int. Cl.
*F16K 17/38* (2006.01)
(52) U.S. Cl. .......................... 137/79; 137/75
(58) Field of Classification Search .................. 137/73, 137/75, 79, 357, 71, 68.12; 251/355.2
See application file for complete search history.

(56) References Cited

U.S. PATENT DOCUMENTS

| 1,502,466 | A | * | 7/1924 | Gillen | 137/77 |
|---|---|---|---|---|---|
| 1,874,019 | A | | 8/1932 | Mangiameli | |
| 2,012,873 | A | | 8/1935 | Gillen | |
| 2,893,413 | A | * | 7/1959 | Nordahl | 137/75 |
| 3,955,186 | A | | 5/1976 | Green et al. | |
| 3,958,592 | A | | 5/1976 | Wells et al. | |
| 3,995,651 | A | | 12/1976 | Adams | |
| 4,239,153 | A | | 12/1980 | Monigold et al. | |
| 4,334,258 | A | * | 6/1982 | Seeman et al. | 361/170 |
| 5,126,934 | A | * | 6/1992 | MacFadyen | 700/11 |
| 5,240,028 | A | * | 8/1993 | Hoch et al. | 137/80 |

(Continued)

FOREIGN PATENT DOCUMENTS

| FR | 1147137 A | 11/1957 |
|---|---|---|
| FR | 2334032 A | 7/1977 |
| GB | 811022 A | 3/1959 |
| GB | 2 084 760 | 4/1982 |
| GB | 2 179 767 | 3/1987 |
| GB | 2 381 569 A | 5/2003 |

(Continued)

*Primary Examiner*—Eric Keasel
*Assistant Examiner*—Cloud Lee
(74) *Attorney, Agent, or Firm*—Buchanan Ingersoll & Rooney PC

(57) ABSTRACT

The present invention relates to a temperature-sensitive safely valve assembly (10). The assembly (10) comprising a first region (16) for a first pressurised fluid, a second region (20) for a second pressurised fluid, a valve (26, 28, 27, 26a and 26b) between the first and second regions (16, 20) designed to be actuated by the pressure of a first pressurised fluid in the first region against biasing means (58) to open an outlet (54), for a first pressurised gas, from the first region, and heat-sensitive sealing means (34) on the second region (20), being de-scalable at high temperature to de-pressurize the second region, thereby actuating the valve (26, 28, 27, 26a, 26b) to close the outlet and seal the first region (16).

17 Claims, 6 Drawing Sheets

U.S. PATENT DOCUMENTS

Figure 1:
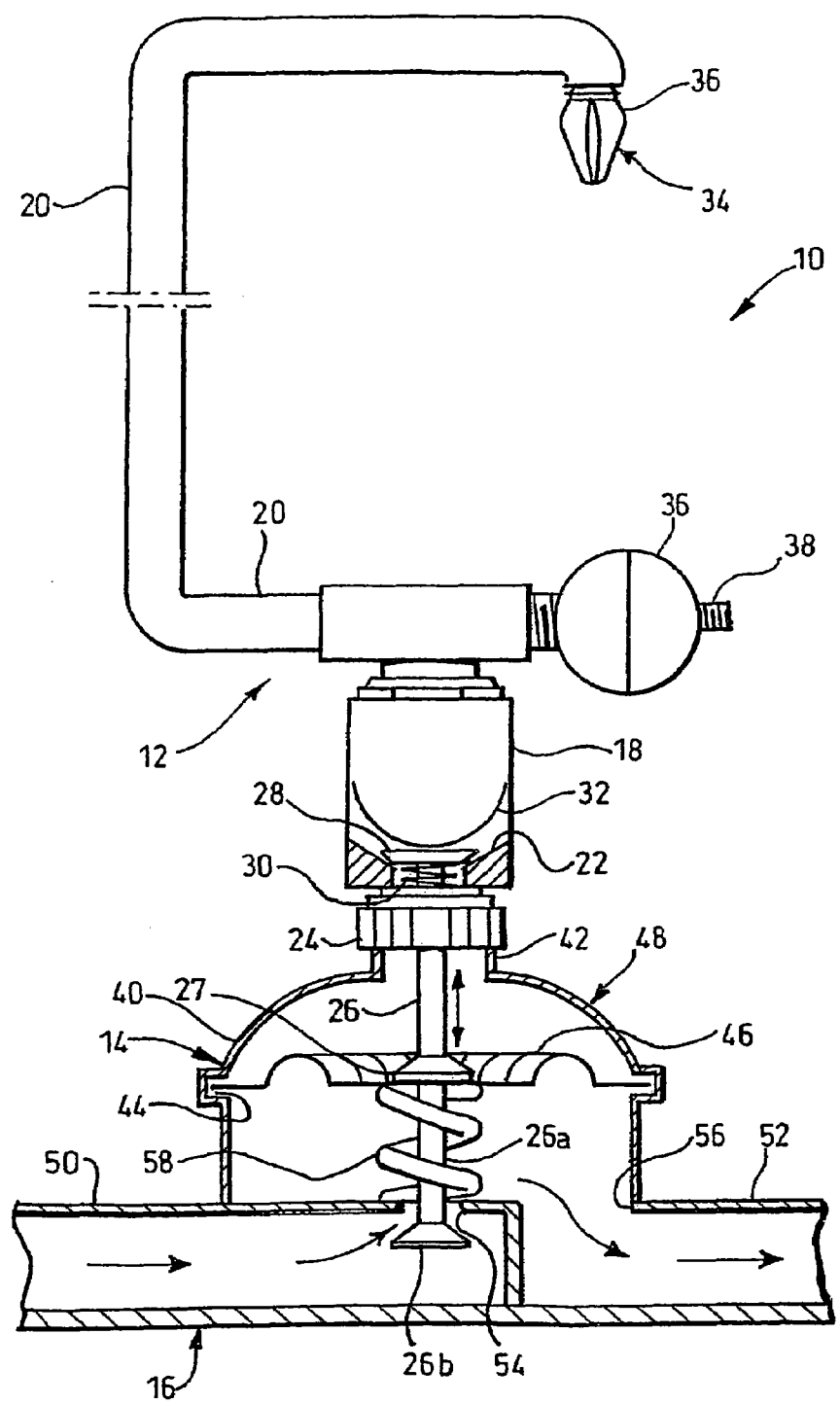

| | | |
|---|---|---|
| 5,263,824 A | 11/1993 | Waldbeser et al. |
| 5,694,960 A | 12/1997 | Turk et al. |
| 5,913,326 A * | 6/1999 | Lembser ...................... 137/79 |
| 6,123,093 A | 9/2000 | D'Antonio et al. |
| 6,170,509 B1 | 1/2001 | Karta |
| 6,199,573 B1 * | 3/2001 | Paskiewicz .................. 137/79 |
| 6,336,510 B1 * | 1/2002 | Gadini ........................ 169/37 |

* cited by examiner

TEMPERATURE-SENSITIVE SAFETY VALVE ASSEMBLY

The present invention relates to a temperature-sensitive safety valve assembly.

It is known to provide a temperature-sensitive safety valve assembly, which, at high temperature, shuts off a gas supply. However, the various methods employed to sense a high temperature and shut off a safety valve in a gas supply line have shortcomings.

It is, therefore, an aim of the invention to provide an improved temperature-sensitive safety valve assembly.

According to a first aspect of the invention there is provided a temperature-sensitive safety valve assembly comprising a first region for a first pressurised fluid, the region having a first outlet, a second region for a second pressurised fluid, the second region comprising a heat-sensitive sealing means, a valve between the first and second regions adapted to be actuated by the pressure of a fast pressurised fluid in the first region against biasing means to open the outlet, wherein the heat-sensitive sealing means in the second region fails at high temperature so as to de-pressurise the second region, thereby actuating the valve to move under the biasing means to close the first outlet and seal the fit region.

In this way, at a cell high temperature, the valve can simply, efficiently, cheaply and quickly shut off a gas supply to, say, a building.

The heat-sensitive sealing means may be an openable and closeable door, a shape-resuming material which deforms from an open to a closed position and vice versa or a solid door which melts to open region. Preferably, the sealing means comprises a fragile part.

The first region and/or second region may be designed to accommodate a liquid Preferably the first region and/or second region is designed to accommodate a flammable gas. Most preferably the first region is designed to accommodate a flammable gas such as natural gas and/or the second region is designed to accommodate air.

The heat-sensitive sealing means is preferably located outside the first region.

Most preferably the sealing means is located on an outside surface of the assembly. This reduces the time lag between sensing a fire and closing the outlet.

The second region preferably comprises a receptacle (made of non-metal temperature-sensitive material). The receptacle is preferably (partly or completely) made of (UPVC) plastics material. Most preferably, the receptacle comprises a conduit. In one form of the invention, the conduit is frangeable at high temperature to de-pressurise the second region. The conduit may be more than one mete long, preferably more than ten meters long and in some embodiments longer than 20 meters. The conduit may follow a gas supply pipe along part of, and in some embodiments along the total length of the gas supply pipe. The conduit may comprise a flexible part, and may take the form of a flexible hose.

The heat-sensitive sealing means preferably comprises a glass bulb. The heat-sensitive sealing means is designed to shatter (or fail) at the temperature of a fire.

The heat-sensitive sealing means is preferably designed and/or orientated to fail so that it does not, in error, still seal the receptacle after failure. For example, in one embodiment of the invention, the heat-sensitive sealing means is designed to face downwards (so that when the glass bulb breaks the remaining parts of the glass bulb fall away from the opening in the receptacle).

A diaphragm is preferably arranged between the first region and the second region so as to prevent mixing of a first pressurised fluid and second pressurised fluid.

Preferably, the second region comprises an inlet valve for refilling of fluid, most preferably one which is dedicated to that sole use. The inlet valve may be in direct communication with a housing for the valve, or remote therefrom.

In one preferred embodiment of the invention, one or more further temperature-sensitive safety valve assemblies are provided, the or each further temperature-sensitive safety valve assemblies being similar to the temperature-sensitive safety valve assembly, wherein at least one of the or each further temperature-sensitive safety valve assembly is in communication with the temperature-sensitive safety valve assembly so that de-sealing of the heat sensitive sealing means on the second region of the or each further temperature-sensitive safety valve assembly is communicated to the temperature-sensitive safety valve assembly to shut the outlet of the temperature-sensitive safety valve assembly.

The or each further temperature-sensitive safety valve assembly are all preferably in communication with the temperature-sensitive safety valve assembly.

According to a second aspect of the invention there is provided a temperature-sensitive safety valve actuator assembly, comprising a region for a pressurised fluid such as air and heat sensitive sealing means on the region, to close the region, and a valve actuator, the temperature-sensitive safety valve actuator assembly being designed to be fitted to a valve assembly for a fluid supply line, and the heat sensitive sealing means being de-sealable at high temperature to de-pressurise the region, to move the valve actuator so as to actuate a valve assembly and close a region for containing fluid.

Preferably, the valve actuator is biased by biasing means such as a spring. Also, preferably there is a diaphragm in the temperature-sensitive safety valve actuator assembly which is designed to separate the pressurised fluid in the region and another pressurised fluid within a fluid supply pipe line.

According to a third aspect of the invention there is provided a building having a temperature-sensitive safety valve assembly or temperature-sensitive safety valve actuator assembly in accordance with, respectively, the first or second aspect of the invention fitted thereto.

Figure 2:
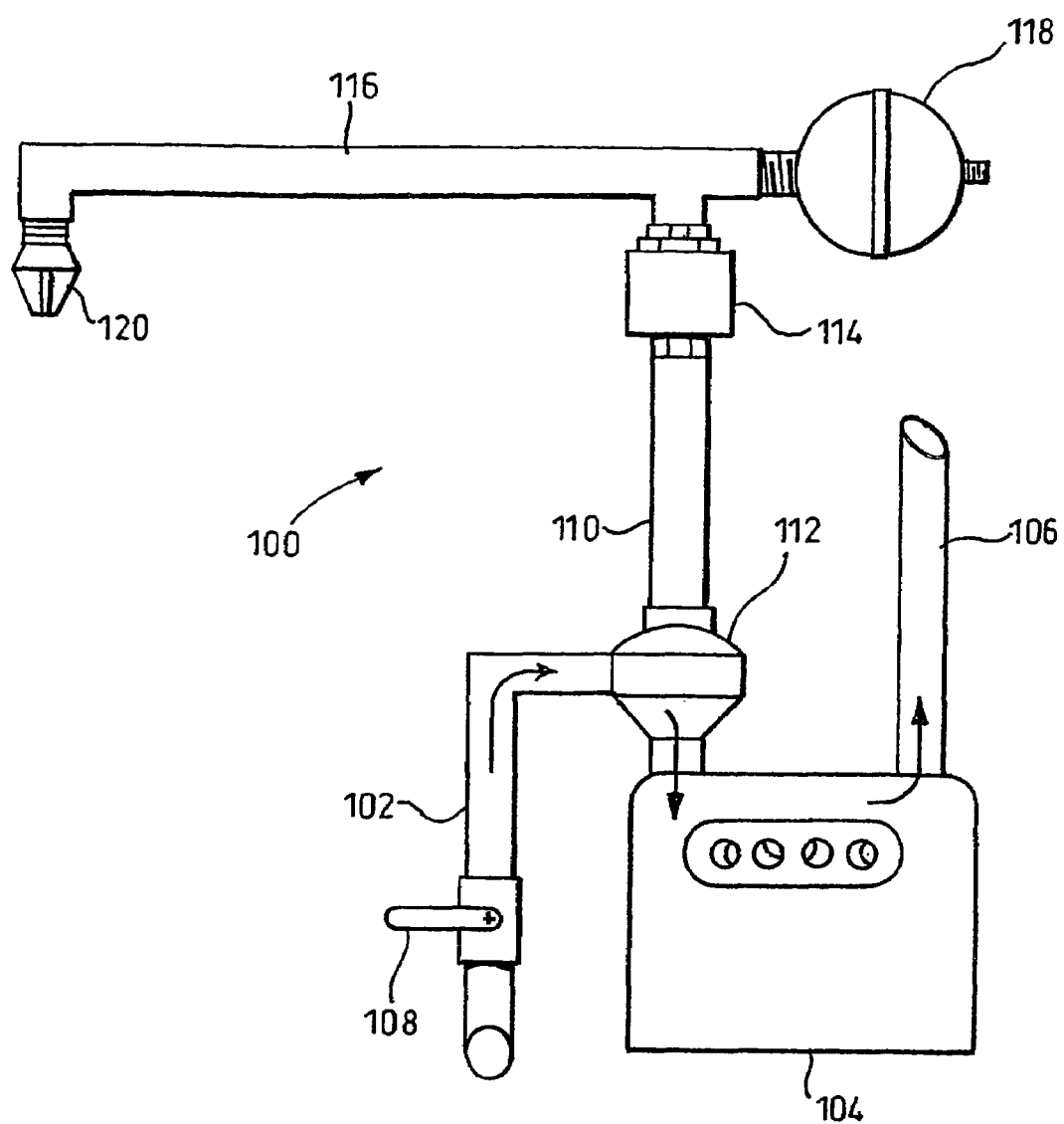
Figure 3:
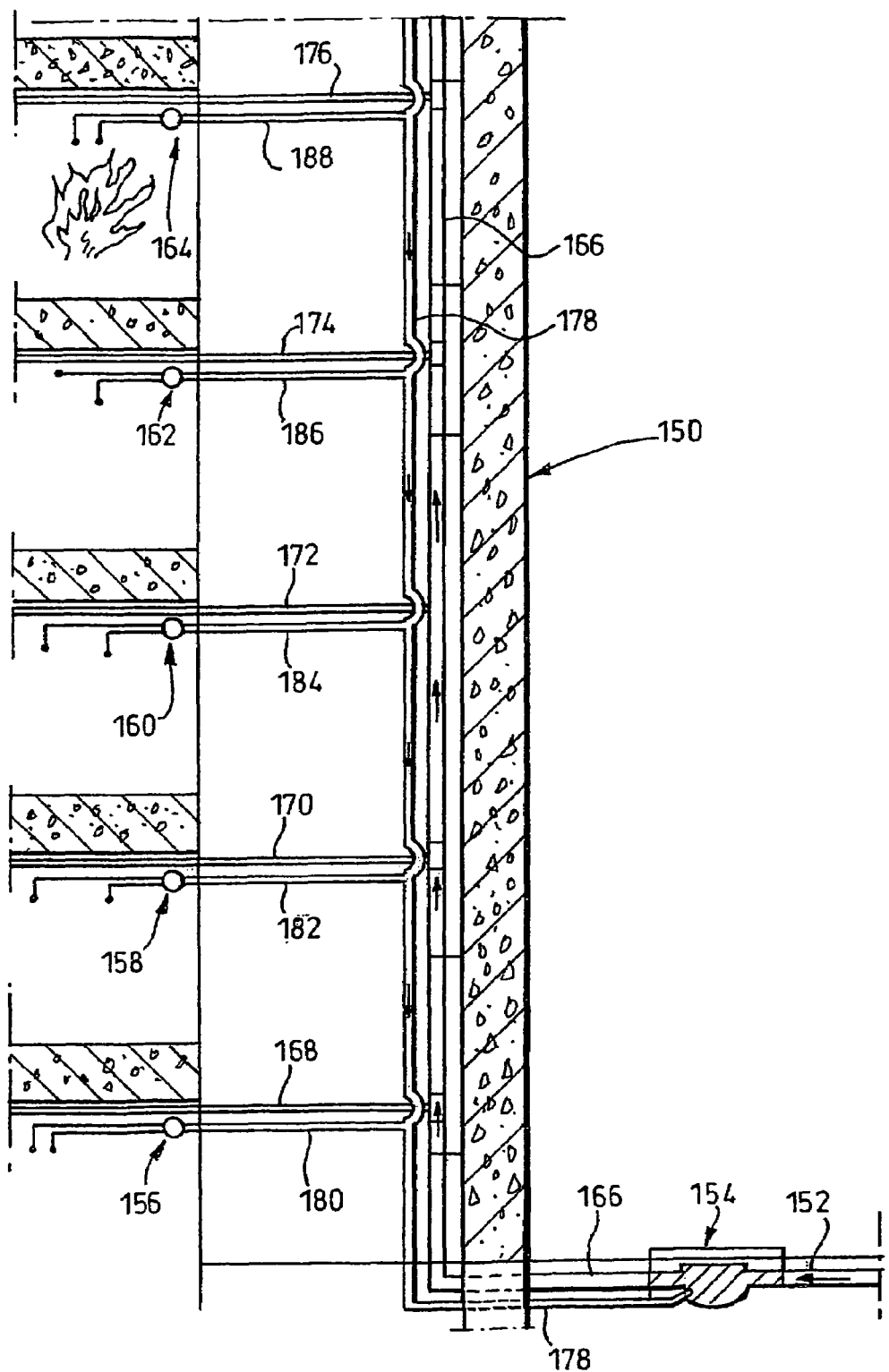
Figure 4:
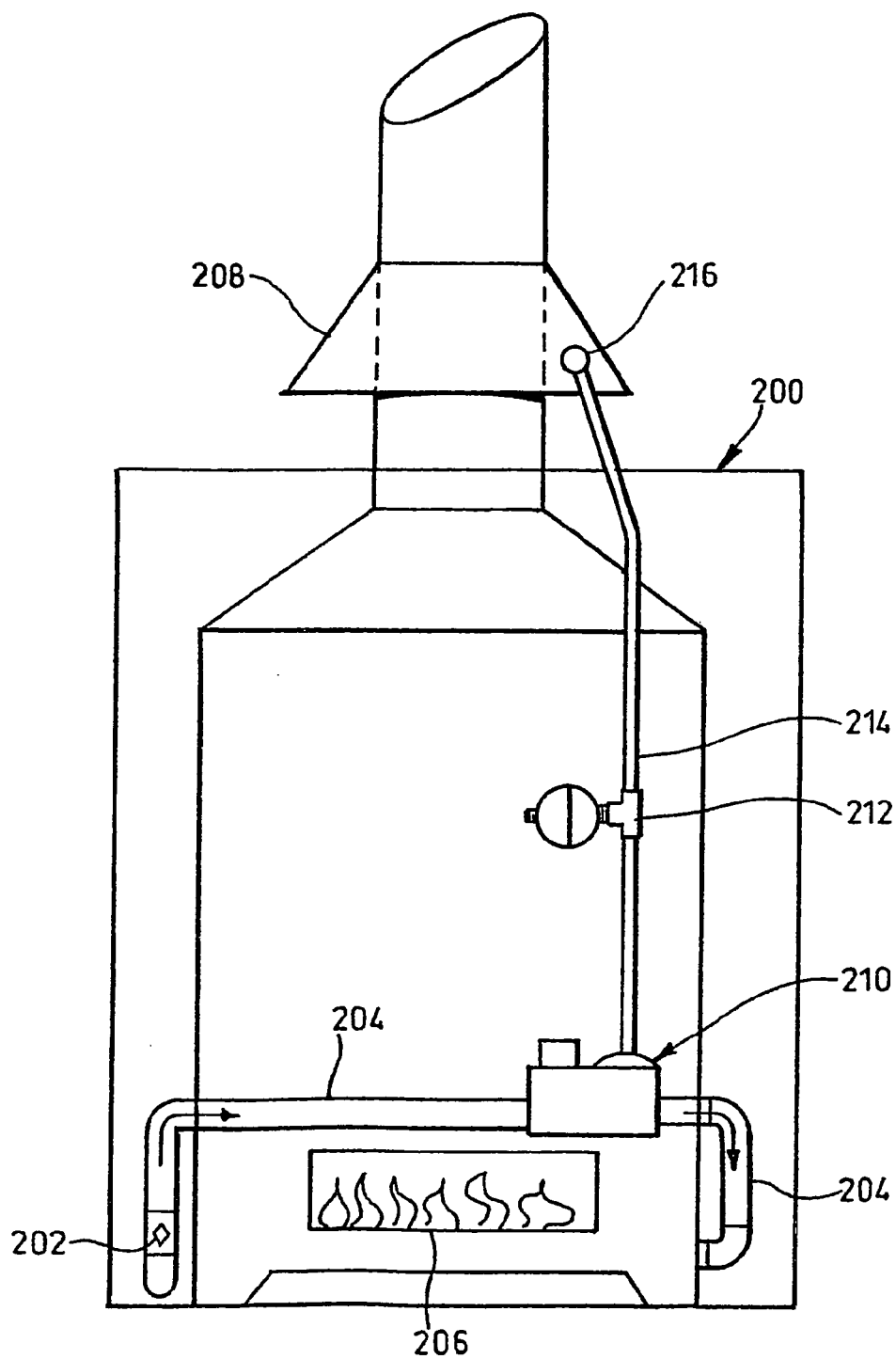
Figure 5:
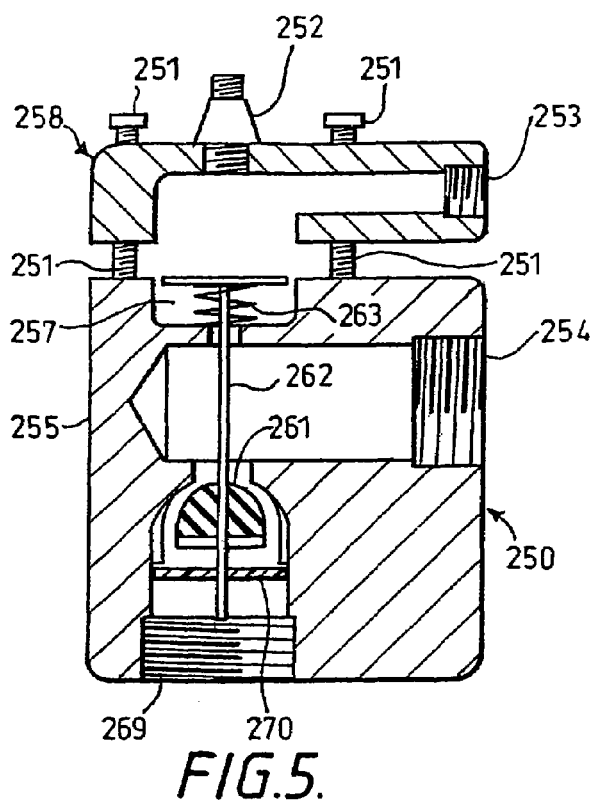
Figure 6:
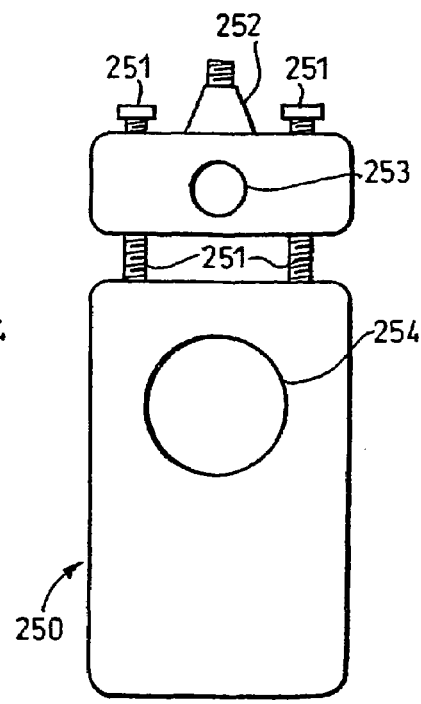
Figure 8:
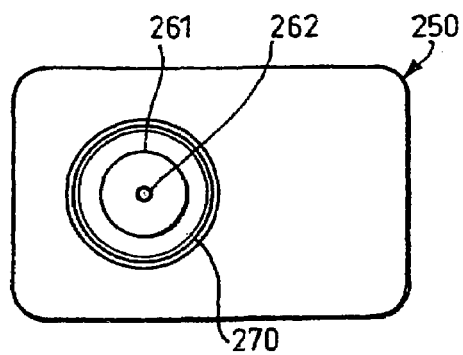
Figure 7:
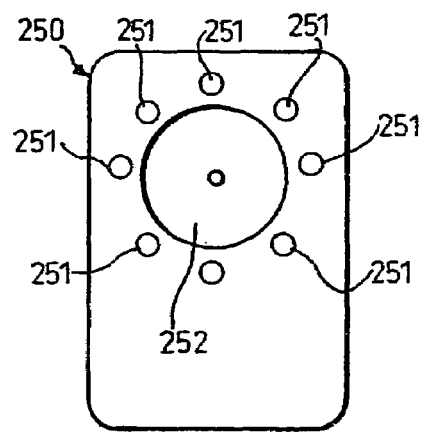
Figure 9:
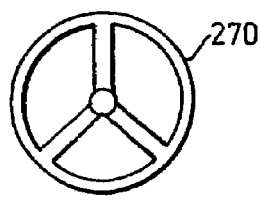
Figure 10:
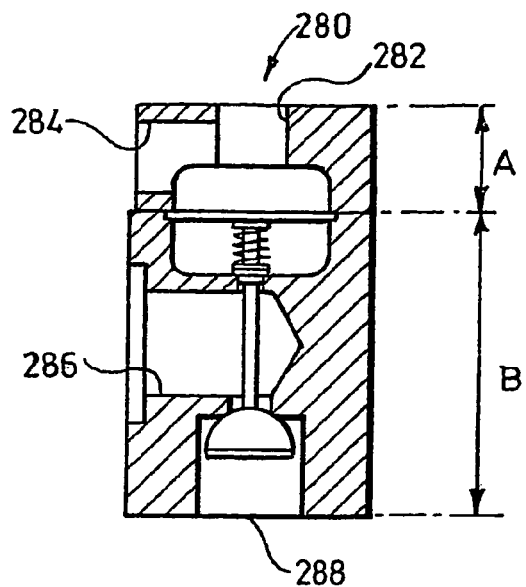
Figure 11:
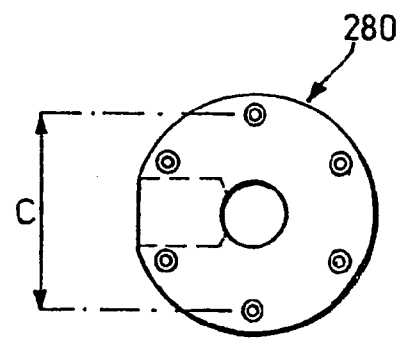
Figure 12:
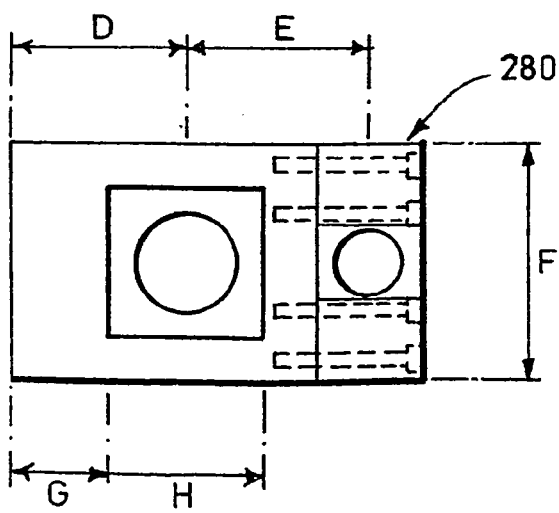
Figure 13:
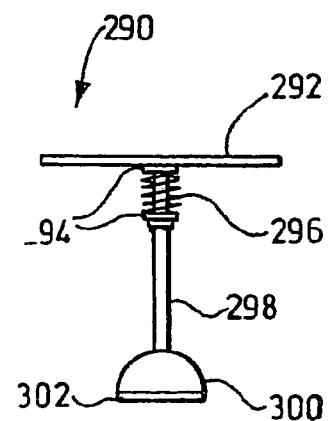

A temperature-sensitive safety valve assembly in accordance with the invention will now be described, by way of example only, and with reference to the accompanying drawings in which;

FIG. 1 is a sole schematic view, partly in cut-away, of a temperature-sensitive safety valve assembly in accordance with the invention, FIG. 2 is a simple schematic view of another temperature-sensitive safety valve assembly fitted in a gas supply line, FIG. 3 is a simple schematic view showing a cut-away of a building and a plurality of temperature-sensitive safety valve assemblies in accordance with the invention fitted therein, FIG. 4 is a simple schematic view of a floor-mounted boiler fitted with a temperature-sensitive safety valve assembly in accordance with the invention, FIG. 5 is a cross-sectional view of a safety valve assembly of a temperature sensitive safety valve assembly in accordance with another embodiment of the invention, FIG. 6 is a front view of the safety valve assembly of FIG. 5, FIG. 7 is a plan view of the safety valve assembly of FIG. 5, FIG. 8 is a bottom view of the safety valve assembly of FIG. 5, FIG. 9 is a bottom view of a support of the safety valve assembly of FIG. 5, FIG. 10 is another cross-sectional view of another safety valve assembly of a temperature sensitive safety valve assembly in accordance with yet another embodiment of the invention, FIG. 11 is a plan view of the assembly of FIG. 10, FIG. 12 is a side view of the assembly of FIG. 10, and FIG. 13 is a side view of part of the assembly of FIG. 10.

Referring to FIG. 1, a temperature-sensitive safety valve assembly 10 comprises a temperature-sensitive safety valve device 12, a regulator 14 and a gas pipe 16.

The temperature safety valve device 12 comprises a housing 18, inside of which is a cavity in communication with a conduit 20.

The housing 18 comprises a valve seat 22, which defines an aperture between the housing 18 and the regulator 14.

A fastener 24 is arranged, at a remote end of the housing 18 for fastening the housing 18 to the regulator 14.

The housing 18 comprises a valve stern (or spindle) 26, arranged with a valve head 28 inside the housing above seat 22. A second valve head 27 is provided at the other end of the stem 26. A spring 30 is arranged around the stem 26 between the valve head 28 and a wall of the housing 18. The valve stem 22 has a secondary stem 26a, which extends from valve head 27, in line with valve stem 26. The secondary stem 26a has a head 26b at an end remote from the end of the secondary stem which extends from the second valve head 27. A diaphragm 32 is arranged above the valve head 28.

The conduit 20 is made of plastics. The conduit 20 is generally U-shaped.

The conduit 20 has a closure member 34, at one end, which takes the form of a glass bulb 36. The conduit is another closure member 36, at another end, which takes the form of a chamber having a one-way valve to allow gas refilling of the conduit 20. A threaded pipe 38 is provided, in communication with the closure member 36, and directly adjacent thereto, to allow connection of a gas supply and prompt refilling of the conduit 20.

The regulator 14, comprises a chamber 40, of dome-like form. The chamber 40 has an inner cavity. The chamber 40 has an aperture defined by a wall 42. The fastener 24 of the housing is threaded onto the outside of wall 42. This step is preceded by introducing the valve stem 26 into the chamber 40. The chamber 40 has an annular recess 44. The recess 44 houses a diaphragm 46, on which the valve head 27 of the valve stem 26 acts. An opening 48 in the chamber 40 allows gas to escape from the chamber to the atmosphere.

The pipe 16 comprises a first pipe part 50 and a second pipe pan 52, which are, respectively, arranged before and after the temperature-sensitive safety valve device 12. The first part 50 has an outlet defined by a valve seat 54. The second part 52 has an inlet 56. The outlet 54 and the inlet 56 are in communication with the chamber 40 of the regulator 14.

The secondary stem 26a is arranged so that the valve head 26b is arranged inside the seat 54 of the pipe part 50. Inside tee chamber 40, a spring 58 is arranged between an underside of the diaphragm 46 and the first pipe part 50.

Suitable K-values for the springs 30 and 28 are utilised. Other features of the temperature-sensitive valve assembly can be seen from FIG. 1.

In use, the first pipe part 50 of the gas pipe 16 is connected to a mains gas supply. Ordinarily, the closure member 34 (i.e. the bulb 36 in one preferred form of the invention) is intact. Therefore, pressure caused by presence of a high pressure gas (such as air) in the conduit 20 acts on the diaphragm 32 to force the valve head 28 and the valve stem 26 down, against the bias of the spring 30. Consequently, the valve head 26b moves away from the seat 54 to allow gas therethrough. Gas is then diverted by the diaphragm 46 into the second pipe part 52 of the pipe 16. In this way, gas is free to move through the second pipe part 52 of the pipe 16 to other parts, for example, to a network of pipes in a building.

In the case of a high temperature, for example a fire, the closure member 34 fails. In the embodiment shown, shattered pieces of the bulb 36 fall downwards so as to not obstruct the conduit 20. The pressure in the conduit 20 falls leading to the valve stem 26 and the valve secondary stem 26a moving towards the conduit 20 (i.e. upwards in FIG. 1), under the force of the spring 58, until the valve head 26b of the secondary stem 26a moves into sealing contact with the valve seat 54 of the first pipe part 50 of the gas pipe 16. In this way, the temperature-sensitive safety valve assembly 10 in accordance with the invention quickly, efficiently, cheaply and simply shuts off the gas pipe 16.

Referring to FIG. 2, a temperature-sensitive safety valve assembly 100, in accordance with another embodiment of the invention, is fitted in series with a gas supply line 102 and a gas meter 104, from which a gas pipe 106 is ducted to, say, part of a building.

The line 102 has a mechanical shut off lever 108 to stop gas entering the temperature-sensitive safety valve assembly 100 and building. The temperature-sensitive safety valve assembly 100 has a tube 110 arranged between a regulator part 112 and a housing part 114 of the temperature-sensitive safety valve assembly.

The conduit 116 is, as in the previous embodiment, fitted to the temperature-sensitive safety valve assembly 100 via a T-piece connector to the housing part 114. The conduit 116 extends generally horizontally. At one end of the conduit 116 there is a valve closure member 118. At the other end of the conduit 116, the conduit extends slightly vertically downwards and a bulb-type closure member 120 is arranged thereon. It will be appreciated that the temperature-sensitive safety valve assembly 100 works in a manner similar to the arrangement of FIG. 1 and as such a full description of the working can be omitted.

Referring to FIG. 3, a building 150 has a plurality of floors. Outside the building 150 a gas mainline 152 communicates with a m temperature-sensitive safety valve assembly 154. The main temperature safety valve assembly 154 is in communication with secondary safety valve assemblies 156, 158, 160, 162, 164 on, say, each floor. Of course, this distribution of the secondary temperature safety valve assemblies could be varied depending on requirements. A gas line 166 extends through the floors, leading to secondary gas lines 168, 170, 172, 174, 176, supplying gas to each floor. An airline 178 also extends from the main temperature-sensitive safety valve assembly 154 to the secondary temperature-sensitive safety valve assemblies 156-164 via, respectively, secondary airlines, 180, 182, 184, 186, 188. In use, failure, and the consequent shut-off, of a secondary temperature-sensitive safety valve 156-164 depressurises the airline 178 so as to shut-off the main temperature-sensitive safety valve assembly 154, outside the building. This is of course advantageous in that a fire inside the building is not fuelled.

Referring to FIG. 4, another temperature-sensitive safety valve assembly in accordance with the invention is shown. A furnace 200 has an on-off gas supply switch 202. Actuation of the switch 202 opens and closes an inlet (not shown) to allow gas to communicate via pipe 204 with the burner of the furnace. A burner region 206 is shown. Above his, there is arranged a flue 208. A temperature-sensitive safety valve assembly 210 is arranged on an inside surface of an inclined wall of the flue 108. A one-way valve 212 of the safety valve assembly 210 is arranged on a line 214 to a bulb 216 in the flue 208. In the event that the flue 208 becomes blocked hot gases will return down the flue causing the bulb to break, which in turn will close off the temperate-sensitive safety valve assembly 210 by thereby stopping gas flowing through the pipe 204 to the burner.

Referring to FIGS. 5 to 9, a safety valve assembly 250 in accordance with the invention comprises a body 258 defining a chamber for air, bolts 251, as inflation point 252, a 15 mm outlet 253 and a 28 mm outlet 254.

The 15 mm outlet 253 is in communication via a conduit (not shown) with a closure member as described with reference to FIG. 1. The 28 mm outlet 254 is in communication with a fuel line (not shown).

The assembly 250 has a lower body 255 defining a gasket chamber 257, which supports a rod 262, a rubber washer 261, a spring 263, and a rod holder 270 (optionally of PVC). FIG. 9 shows the spoked wheel-like, structure of the rod holder 270.

The lower body 255 comprises a 28 mm inlet 269, which is put in communication with a fuel line (not shown).

Operation of the assembly 250 follows, in general, the principles of operation of the assembly 10 described above.

Referring to FIGS. 10 to 13, another safety valve assembly 280 comprises some similar parts to the safety valve 250 and therefore such parts will not be described again.

Referring to FIG. 10, the total height of the body equal the height A of the upper body (A=30 mm) and the height B of the lower body (B=87 mm). The inflating point 282, outlet 284, outlet 286, and inlet 288 are, respectively ½" BSP, ½" BSP, 1" BSP and 1" BSP.

Referring to FIG. 11, the distance C between diametrically opposed bolts is 58 mm.

Referring to FIG. 12, the distance D form the bottom of the body to the centre of the outlet 286 is 49.5 mm. The distance E from the centre of the outlet 286 to the centre of the outlet 284 is 52.5 mm. The distance G from the bottom of tee body to the lower edge of the region about the outlet 286 is 27 mm. The distance across the region about the outlet 286 is 45 mm.

Referring to FIG. 13, a valve assembly 290 comprises a diaphram 292, spring seats 294, a spring 296, a centre rod 298, a rubber seal 300 and a backing washer 302.

The valve in accordance with the invention can be made to tolerate pressures up to 6000 PSI.

The conduit can be a flexible hose.

The invention claimed is:

1. A temperature-sensitive safety valve assembly comprising:
    a first region for a first pressurised fluid, the region having a first outlet,
    a second region for a second pressurized fluid, the second region comprising a heat-sensitive sealing means, wherein the first pressurized fluid is different from the second pressurized fluid,
    a separating means arranged between the first region and the second region so as to prevent mixing of the first pressurized fluid and the second pressurized fluid,
    a valve between the first and second regions which is arranged to be actuated by the pressure of the second pressurized fluid in the second region against a biasing means to open the first outlet,
    wherein the heat-sensitive sealing means in the second region is arranged to fail at high temperature so to de-pressurise the second region, thereby actuating the valve to move under the biasing means to close the first outlet and seal the first region, and
    wherein the heat-sensitive sealing means is designed to shatter when exposed to the temperature of a fire.

2. A temperature-sensitive safety valve assembly according to claim 1, wherein the second region is designed to accommodate a liquid.

3. A temperature-sensitive safety valve assembly according to claim 1, wherein the second region comprises a receptacle.

4. A temperature-sensitive safety valve assembly according to claim 3, wherein the receptacle is made of plastics material.

5. A temperature-sensitive safety valve assembly according to claim 3, wherein the receptacle comprises a conduit.

6. A temperature-sensitive safety valve assembly according to claim 5, wherein the conduit is frangible at high temperature to depressurise the second region.

7. A temperature-sensitive safety valve assembly according to claim 5, wherein the conduit is more than one meter long.

8. A temperature-sensitive safety valve according to claim 5, wherein the conduit follows a gas supply pipe along at least part of its length.

9. A temperature-sensitive safety valve according to claim 5, wherein the conduit comprises a flexible part.

10. A temperature-sensitive safety valve assembly according to claim 1, wherein the heat sensitive sealing means comprises a glass bulb.

11. A temperature-sensitive safety valve assembly according to claim 1, wherein the second region is designed to accommodate a gas.

12. A temperature-sensitive safety valve assembly according to claim 1, wherein the heat sensitive sealing means is designed to face downwards.

13. A temperature-sensitive safety valve assembly according to claim 1, wherein the second region comprises an inlet valve for refilling of gas.

14. A temperature-sensitive safety valve assembly according to claim 1, wherein one or more further temperature-sensitive safety valve assemblies are provided and wherein the or each further temperature-sensitive safety valve assembly is in communication with the temperature-sensitive safety valve assembly so that failure of the heat sensitive sealing means on the second region of the or each temperature-sensitive safety valve assembly is communicated to the further temperature-sensitive safety valve assembly to shut down fluid at the temperature-sensitive safety valve assembly.

15. A temperature-sensitive safety valve assembly according to claim 1, wherein the temperature-sensitive safety valve assembly is installed in a building.

16. A temperature-sensitive safety valve assembly according to claim 1, wherein the temperature-sensitive safety valve assembly is arranged on an inside surface of an inclined wall of a flue of a burner assembly.

17. A temperature-sensitive safety valve assembly according to claim 1, wherein the heat-sensitive sealing means is adapted to shatter at a predetermined high temperature corresponding to a temperature indicative of a fire.

* * * * *